United States Patent [19]

Keslowitz

[11] Patent Number: 5,055,996
[45] Date of Patent: Oct. 8, 1991

[54] CENTRAL CONTROL AND MONITOR UNIT
[75] Inventor: Saul L. Keslowitz, Bayside, N.Y.
[73] Assignee: Grumman Aerospace Corporation, Bethpage, N.Y.
[21] Appl. No.: 254,213
[22] Filed: Oct. 6, 1988
[51] Int. Cl.$^5$ .............................................. G06F 15/46
[52] U.S. Cl. .................... 364/188; 340/701; 364/138
[58] Field of Search ................ 364/188, 189, 191–193, 364/138, 200 MS File, 900 MS File, 474.22–474.27; 340/701, 703, 706, 707, 711, 712

[56] References Cited

U.S. PATENT DOCUMENTS

| | | | |
|---|---|---|---|
| 4,217,577 | 8/1980 | Roe et al. | 340/703 |
| 4,303,973 | 12/1981 | Williamson, Jr. et al. | 364/189 X |
| 4,303,986 | 12/1981 | Lans | 364/900 |
| 4,396,977 | 8/1983 | Slater et al. | 364/188 |
| 4,648,028 | 3/1987 | DeKlotz et al. | 340/703 X |
| 4,679,135 | 2/1987 | Kobayashi et al. | 364/188 |
| 4,833,592 | 5/1989 | Yamanaka | 364/188 X |

OTHER PUBLICATIONS

"Open Control/Display System for a Telerobotics Work Station", by Dr. Saul Keslowitz, 1987 Goddard Conference on Space Applications of Artificial Intelligence and Robotics.

"An RMS-86 Multi-Microcomputer Controls and Display Laboratory for Space Station Simulations", by Dr. Saul Keslowitz, date unknown.

*Primary Examiner*—Joseph Ruggiero
*Attorney, Agent, or Firm*—Scully, Scott Murphy & Presser

[57] ABSTRACT

A central control and monitor unit and a method of operating the same. The control and monitor unit is for use with a multitude of peripheral work units, each of which has at least a plurality of common states. The control and monitor unit comprises a video display device, and an imaging device to show a multitude of transient switches on that display device. Each shown switch is associated with one of the peripheral work units, and shown switches are touched to change the states of the work units associated with the switches. The imaging device is controlled to display each shown switch in a first common format when the work unit associated with the switch is in a first state, and to display each shown switch in a second format when the work unit associated with the switch is in a second state.

13 Claims, 2 Drawing Sheets

CENTRAL CONTROL AND MONITOR UNIT

BACKGROUND OF THE INVENTION

This invention generally relates to man-machine interface protocols, and more specifically, to such a protocol for transiently shown control switches that are visually displayed on a video screen or other similar display means.

In many situations, a multitude of remote or peripheral work units are controlled or operated from a central control unit. This central control unit may have a multitude of control switches to at least actuate and deactuate the peripheral work unit, and commonly to also cause those work units to perform various functions or tasks. The control unit may, in addition, have one or more gauges or video screens to display parameters or other data relating to the remote work units.

Recently, procedures have been developed to control the operation of such peripheral work units by means of switches transiently shown on a video screen. With this procedure, a multitude of switches are displayed on a video screen, with each of these switches being used to control the operation of an associated peripheral work unit. When one of the displayed switches is touched, a signal is generated identifying the area of the screen being touched. This signal is conducted to a central processor that identifies the switch being engaged and the work unit associated with that switch; and the central processor, in turn, generates a signal that is conducted to that associated work unit to change the state of the work unit. For example, this signal from the central processor may be used to actuate or deactuate the work unit.

A major advantage of this procedure is that the central control unit may be made very compact because a single, relatively small video screen may be used to show all, or most, of the switches used to control the peripheral work units. To elaborate, while only a limited number of switches can be shown on the video screen at any one time, the display on the screen can be changed to show different sets of switches at different times so that, over time, a very large number of switches can be shown on just one video screen. There is a disadvantage with the above-discussed procedure in that, in comparison to conventional prior art switches such as toggle switches, the positions of the transient switches displayed on the video screen do not change as the states of the associated work units change, and thus the positions of the displayed switches do not indicate the states of the associated work units. This may make it difficult for an operator to determine the current states of those work units.

SUMMARY OF THE INVENTION

An object of this invention is to show transient switches on a video screen or similar display device in accordance with a uniform protocol to identify the states of various work units that are controlled or operated by those switches.

Another object of the present invention is to provide a central control unit of the type wherein a video screen displays a multitude of transient switches that are used to control peripheral work units, with means to illuminate each switch in a first common format when the work unit controlled by the switch is in a first common state, and to illuminate each switch in a second common format when the unit controlled by the switch is in a second common state.

A further object of this invention is to show different designs on transient switches that are displayed on a video screen and that are used to control various peripheral work units, depending on the states of the work units controlled by the switches.

These and other objectives are attained with a central control and monitor unit for use in a multi-unit work system of the type including a multitude of peripheral work units, each work unit having at least a plurality of common states. The central control and monitor unit comprises display means to show a multitude of transient control switches. Each shown control switch is associated with one of the peripheral work units, and contact against a given control switch changes the state of the work unit associated with that switch. The central control and monitor unit further includes image control means to display each shown control switch in a first common format when the work unit associated with the switch is in a first common state, and to show each shown control switch in a second common format when the work unit associated with the switch is in a second common state.

Preferably, the image control means includes a processor and an imaging means. When a switch is contacted to change the work unit associated with the switch from the first common state to the second common state, the processor generates a graphics change signal to change the format of the contacted switch from the first common format to the second common format. Analogously, when a switch is contacted to change the associated work unit from the second state to the first, the processor generates a graphics change signal to change the format of the contacted switch from the second common format to the first common format. The imaging means receives the graphics change signals from the processor and controls the format of each control switch shown on the display means.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
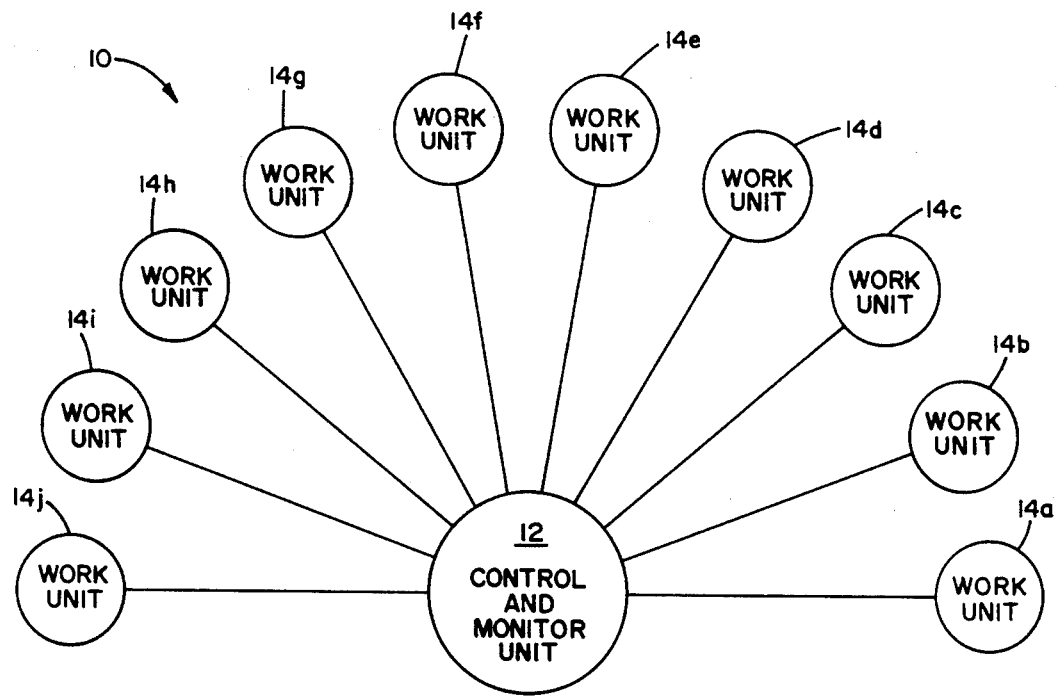
FIG. 1 schematically illustrates a multi-unit work system.

FIG. 1 schematically illustrates system 10 generally comprising a central control and monitor unit 12, a multitude of peripheral work units 14a through j, and data transmission means 16 to transmit data between the work units and the central control and monitor unit. System 10 may take many forms and may be used in many applications. For example, it is contemplated that system 10 may be used on a space craft, with each of the work units comprising a mechanical device or mechanical equipment used to perform a specific experiment or task. As another example, the work units 14a through j may be data input or output terminals controlled, at least in part, by the central unit 12. As still another example, system 10 may be used in a factory, with each of the work units comprising a work station, robot or other device that may be controlled by central unit 12.

Any suitable means 16 may be employed to transmit data from central unit 12 and the peripheral work units 14a–j. For example, this data may be transmitted by cables or wires that are physically connected to central unit 12 and the work units 14a–j, or alternatily, this data may be transmitted by electromagnetic wave signals without requiring any direct physical connection between central unit 12 and the work units 14a–j.

Figure 2:
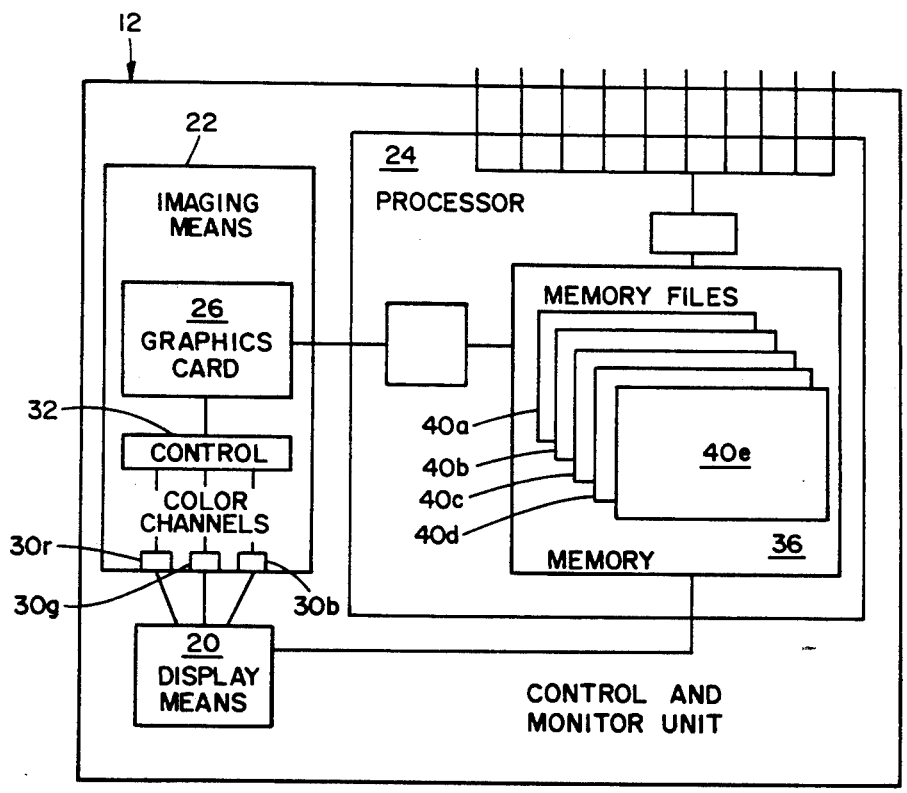
FIG. 2 is a more detailed schematic drawing of a central control and monitor unit of the work system.

As illustrated in FIG. 2, the central control and monitor unit 12 generally comprises display means 20, imaging means 22 and processor 24. Display means 20 is such that a video image may be shown on the display means by modulating or generating light at selected display positions which, in the preferred embodiment, are positions along a cathode ray tube raster. As will be understood, other types of display devices may be used in the practice of the present invention.

Imaging means 22 is provided to generate a signal and to transmit that signal to display means 20 to produce the desired image on the display means. Any suitable imaging means may be used in system 10; and for instance, the necessary information for a given display may be stored on graphics card 26, and coded information read from the graphics card may be directed to color channels 30r, g and b by control equipment 32. In a conventional manner, the color channels 30r, g and b transmit signals to display means 20 to produce the desired video pattern on the display means, and each color channel contains a register so that the information in the channel can be synchronized with operation of the display means. The coded data on graphics card 26 can be changed so that, at different times, different images can be shown on display means 20.

The images shown on display means 20 may include a multitude of items such as charts or graphics showing various parameters or other data pertaining to the work units 14a–j of system 10. These shown items include control switches that are used to change the state or condition, or otherwise control operation, of the work units. Any given image may show no such control switches, or one or more of these control switches. Each shown control switch is associated with one of the work units of system 10; and preferably, in any given shown set of control switches, each switch is associated with a respective one of the work units. Other arrangements are possible, though, and for instance, a shown switch may be associated with a plurality of the work units, or a plurality of switches may be associated with a single one of the work units.

Figure 3:
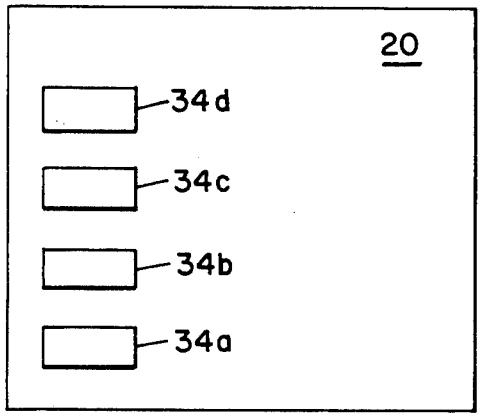
FIG. 3 is an outline of a video screen of the control and monitor unit, with a multitude of control switches shown on the screen.
Figure 4:
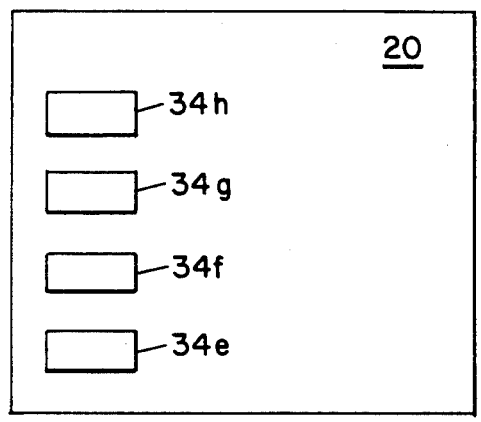
FIG. 4 is an outline of the video screen, with a second set of control switches shown thereon.
Figure 5:
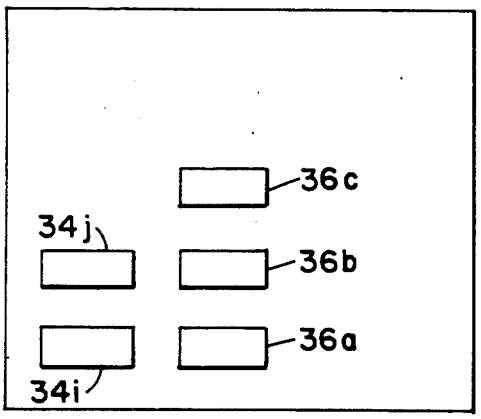
FIG. 5 is a third view of the video screen and with a third set of control switches shown thereon.

With reference to FIG. 3, at a first time, four switches 34a, b, c, and d may be shown on display means 20, with each switch being associated with a respective one of the work units 14a, b, c, and d; and in particular, switches 34a, b, c, and d may be used to actuate and deactuate work units 14a, b, c, and d respectively. At another time, as shown in FIG. 4, four other switches 34e, f, g, and h may be shown on display means 20, with each of these other switches being used to actuate and deactuate work units 14e–h respectively. At still another time, as shown in FIG. 5, five switches may be shown on the display means, with two of these switches 34i and j being used to actuate and decuate work units 14i and j, respectively, and three of the shown switches 36a, b and c being used to control certain features of those work units. Preferably, the function associated with each switch is written or abbreviated inside it.

To help an operator determine the states or conditions of work units 14a–j, each switch shown on display means 20 is shown in a first common format when the work unit associated with the switch is in a first common state, and each switch shown on the display means is shown in a second common format when the work unit associated with the switch is in a second common state. As will be understood by those of ordinary skill in the art, these first and second common formats may each comprise any one of a number of forms, configurations or arrangements. For example, each switch shown on display means 20 may be shown in a first color when the associated work unit is in the first common state, and in a second color when the associated work is in the second common state. Alternatively, each switch shown on display means 20 could be shown in a first particular pattern or texture or with a first particular symbol when the associated work unit is in the first common state, and in a second particular pattern or texture or with a second particular symbol when the associated work unit is in the second common state.

Likewise, the above-mentioned first and second common states of the work units 14a–j may be any state or condition common to all of the work units of system 10. For instance, if all of the work units have actuated, or on, and deactuated, or off, conditions, the first common state may be the actuated condition, and the second common state may be the deactuated condition. Work units 14a–j may have other common states, though. For example, each work unit may operate at high or low speeds; and the first common state may be the high speed operating condition of the work unit, while the second common state may be the low speed operating condition of the work unit. As still another example, each work unit may perform the same or a corresponding sequence of tasks; and the first common state may be when the work unit is performing a first of these tasks, and the second common state may be when the work unit is performing a second of these common tasks.

Processor 24 includes a memory section 36 that, in turn, includes a multitude of memory files 40a–e. Each display that may be shown on display means 20 is associated with one of the memory files, and each memory file identifies a particular set of control switches that may be shown or illuminated on display means 20 at a given time. For the set of switches associated with each memory file, that file identifies (i) the location of each switch on the screen, (ii) the current format of each switch, (iii) the work unit associated with each switch, and (iv) the area on the graphics card having the data controlling the manner in which the switch is shown on the display means. For the set of switches associated with each memory file, that file also includes first and second tables for each switch summarizing, respectively, the formats and format changes for the switch, and the states and state changes for the work unit associated with the switch. In particular, this first table for each switch indicates, for each format of the switch, the format to which the switch should change after being touched; and the second table for each switch indicates, for each state of the work unit associated with the switch, the state to which the work unit should change after the associated switch has been touched.

In operation, when one of the switches shown on the display means 20 is touched, this display means generates a signal identifying the area on the display means being touched, and this signal is transmitted to processor 24. Processor 24 identifies the switch being touched, determines the current format of that switch and the format to which the switch should be changed, determines the area on graphics card 26 having the data controlling the manner in which the touched switch is illuminated, and generates a signal that is conducted to the graphics card to change the data therein to illuminate the switch in the new format. At the same time, processor 24 identifies the work unit associated with the touched switch, identifies the current state of that associated work unit and the state to which the work unit should be changed, and generates a state change signal, which is conducted to the appropriate work unit to change the state thereof. The processor 24 also updates its own memory files to identify the new format of the shown switch and the new state of the associated work unit.

The switches shown on display means 20 may be occasionally engaged unintentionally or by error; and for this reason, one or more of the work units 14a–j may be designed so that, when the associated switch is touched, the work unit does not automatically change from a first particular state to a second particular state, but instead changes into a third state, referred to as a waiting state. With one type of work unit that system 10 may include, the work unit will wait in this third state for a given length of time. If, within this given length of time, a confirmation signal is transmitted to the work unit to confirm the initial engagement of the associated switch, then the work unit changes from the waiting state to the above-mentioned second particular state; however, if no confirmation signal is transmitted to the work unit during the given length of time, the work unit automatically returns to the above-mentioned first particular state. With another type of work unit that system 10 may include, the work unit will wait indefinitely in this third state until either a confirmation signal or a cancel signal is transmitted to the work unit. If the confirmation signal is transmitted to the work unit, that unit then changes into the second particular state; but if the work unit receives the cancel signal, the work unit returns to the first particular state.

To help an operator determine when a work unit is in this third state, each switch that is shown on display means 20 is shown in a third common format when the work unit associated with the switch is in this third state. For example, if each switch shown on display means 20 is shown in a first color when the associated work unit is in the first state, and in a second color when the associated work unit is in the second state, then the switch is shown in a third color when the associated work unit is in the third state. Similarly, if each switch shown on display means 20 is shown in a first pattern when the associated work unit is in the first state and in a second pattern when the associated work unit is in the second state, then the switch is shown in a third pattern when the associated work unit is in the third state.

Figure 6:
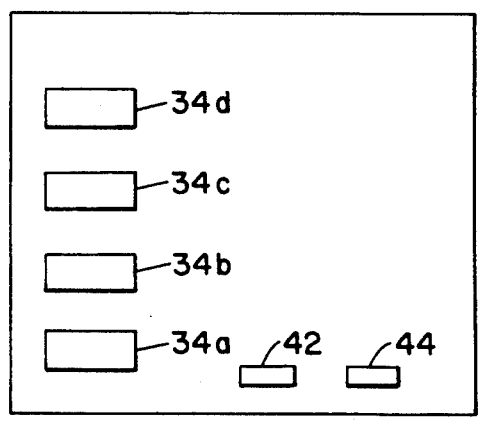
FIG. 6 is similar to FIG. 3, but also showing two additional switches.

Preferably, when one of the switches shown on display means 20 is touched to change the associated work unit to the waiting state, first and second additional switches, referred to as confirm and cancel switches, respectively, as shown in FIG. 6 at 42 and 44, are illuminated on the display means. An operator touches entry switch 42 to conduct the above described confirmation signal to a work unit, and an operator engages the cancel switch 44 to conduct the above-described cancel signal to a work unit.

More specifically, when an operator touches either the entry or cancel switches, display means 20 generates a signal identifying the location at which the display means is being touched, and this signal is transmitted to processor 24. Processor 24 identifies the switch that was touched, and generates a confirmation or a cancel signal as appropriate. This new signal is conducted to the work unit most recently changed to the waiting state, to change that work unit to the appropriate state.

With this embodiment, preferably, whenever these first and second additional switches 42, 44 are displayed, they are both shown in the third common format—that is, in the same format in which the control switches are displayed when the work units associated with the control switches are in the waiting state. Thus, for instance, if the control switches are shown in a given color when the associated work units are in the waiting state, then the entry and cancel switches, when shown, are also displayed in this given color. Similarly, if a control switch is shown in a particular pattern when the associated work unit is in the waiting state, then the entry and cancel switches, when shown, are displayed in this particular pattern.

Figure 7:
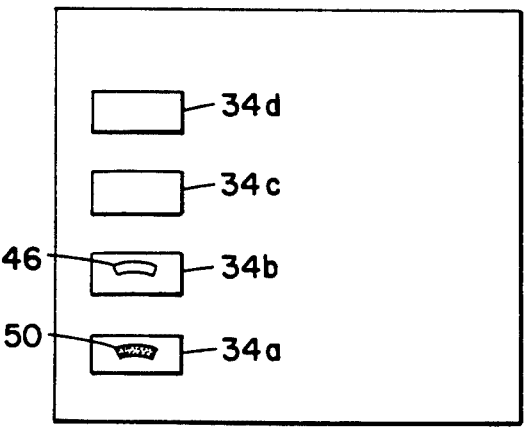
FIG. 7 is similar to FIG. 3, but also shows a first character on one of the control switches and a second character on another of the control switches.

With an embodiment of the invention that has been actually reduced to practice, each control switch shown on display means 20 is shown in light blue with a white grid pattern when the associated work unit is deactuated, shown in green when the associated unit is actuated, and shown in yellow when the associated work unit is in a waiting state. To assist an operator who might be color blind, preferably a first common symbol is also shown on each control switch when the associated work unit is in the waiting condition, and a second common symbol is shown on each switch when the associated unit is in the actuated condition. With reference to FIG. 7, this first uniform symbol may be an outline of an arch 46 drawn at the top of the switch, and the second uniform symbol may be a filled arch 50 also shown at the top of the switch. A symbol may be in the same color as, or a different color than, the rest of the switch. If a symbol is shown in the same color as the rest of a switch, then the symbol is shown in a lighter or darker shade of that color compared to the rest of the switch.

Numerous other items may also be shown on display means 20. For instance, displays may be produced showing one or more parameters of one or more of the work units 14a–j and indeed, displays may be produced showing one or more of the work units themselves. In addition, a group of master control switches may be shown on display means 20 to control the display means itself and, in particular, to select the control switches that are shown on the display means. Typically, display means 20 also displays text giving data, instructions or messages. Moreover, control and monitor unit 12 may have a plurality of permanent displays and switches (not shown), for instance to actuate and deactuate the control and monitor unit itself. For the sake of clarity and simplicity, these other items are not shown in the drawings.

The central control and monitor unit 12 shown in FIG. 2 may be made from known devices, and numerous suitable devices are available to those skilled in the art. For instance, display means 20 may be a cathode ray tube, model no. 7211 sold by Conrac Inc., which has a place of business in West Amherst, N.Y.

Although the operation of the present invention will be clear from a review of the above-discussion, several examples of the operation of system 10 will be briefly described below.

In FIG. 6, control switches 34a, b, c and d are shown on display means 20, and these switches are used to actuate and deactuate work units 14a, b, c and d respectively. Initially, all of these work units are deactuated, and thus all of the switches 34a, b, c and d are displayed in light blue with a white grid. To actuate work unit 14a, switch 34a is touched. This generates a first signal that is conducted to processor 24 which, as described above, generates a second signal that is conducted to work unit 14a to actuate the work unit. At the same time, processor 24 generates a third signal that is transmitted to graphics card 26 to change the database therein so that switch 34a becomes illuminated in red on display means 20. To deactuate work unit 14a, switch 40a is touched again. In response, display means 20 generates a signal that is conducted to processor 24, and the processor generates a signal that is conducted to work unit 14a to deactuate the work unit. Processor also generates another signal that is transmitted to graphics card 26 to change the data therein so that switch 34a again is illuminated in light blue with a white grid.

To actuate work unit 14b, switch 34b is touched. This generates a signal that is conducted to processor 24, and the processor, in turn, generates a signal that is conducted to work unit 14b. In response, work unit 14b changes into the waiting state. Processor 24 also generates a signal that is transmitted to graphics card 26, first, to change the data therein to show switch 14b in yellow, and second, to show the entry and cancel switches on the display means. If the operator still wants to actuate work unit 14b, the entry switch is pressed. Display means 20 generates a signal that is conducted to processor 24, and in response, the processor generates a confirmation signal that is conducted to work unit 14b to actuate that work unit. The processor also generates a signal that is transmitted to graphics card 26 to show switch 34b in red and to remove the entry and cancel switches from the display that is on display means 20.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

I claim:

1. A central control and monitor unit for use in a multi-unit work system of the type including a multitude of peripheral work units having at least a plurality of common states, the central control and monitor unit comprising:

display means to show a multitude of sets of transient control switches, each shown control switch being associated with one of the peripheral work units, and wherein each switch is contacted to change the state of the work unit associated therewith;

image control means to display each shown control switch in a first common format when the work unit associated with the control switch is in a first of the common states, and to display each shown control switch in a second common format when the work unit associated with the control switch is in a second of the common states, the image control means including processing means including a multitude of memory files, each of the memory files identifying the switches of one of said sets of control switches; and means to select one of the memory files to show on the display means the switches identified in the selected one memory file; and wherein for each switch in the set of switches identified in each of the memory files, the memory file identifies a location of the switch on the display means, the work unit associated with the switch, a current format for showing the switch, and a format for showing the switch after the switch is contacted.

2. A central control and monitor unit according to claim 1, wherein:

the processing means is adapted to generate a graphics change signal to change the format of a given switch from the first common format to the second common format when said given switch is contacted to change the associated work unit from the first common state to the second common state, and to generate a graphics change signal to change the format of the given switch from the second common format to the first common format when said given switch is contacted to change the associated work unit from the second common state to the first common state; and the image control means further includes imaging means to receive the graphics change signals from the processing means and to control the format of each control switch shown on the display means.

3. A central control and monitor unit according to claim 2, wherein a group of the work units has a third common state, and the image control means is adapted to display each shown control switch that is associated with one of said group of work units, in a third common format when said one work unit is in the third common state.

4. A central control and monitor unit according to claim 3, wherein the first state of each work unit is a deactuated state, the second state of each work unit is an actuated state, the third state of each of said group of work units is a waiting state, and wherein:

the image control means is adapted to show a first additional switch on the display means in the third common format when any one of said group of work units is changed from the deactuated state to the waiting state; and the processor is further adapted to generate a confirmation signal when said first additional switch is contacted to change said one of the work units to the actuated state.

5. A central control and monitor unit according to claim 4, wherein:

the image control means is further adapted to show a second additional switch on the display means in said third common format when any one of said group of work units is changed to the waiting state; and the processor is further adapted to generate a cancellation signal when said second additional switch is contacted to return said one of the work units to the deactuated state.

6. A central control and monitor unit according to claim 5, wherein:
the first common format comprises a first color;
the second common format comprises a second color; and
the third common format comprises a third color.

7. A central control and monitor unit according to claim 6, wherein the image control means is adapted to show a first common character on each switch that is associated with one of said group of work units, when the work unit associated with the switch is in the waiting state and to show a second common character on each switch when the work unit associated with the switch is in the actuated state.

8. A method of operating a central control and monitor unit of a multi-unit work system of the type including a multitude of peripheral work units, the work units having at least a plurality of common states, the central control and monitor unit including a processor having a multitude of memory files, each of the memory files identifying a set of control switches for the work units, the method comprising:
selecting one of the memory files;
showing on a display means of the central control and monitor unit, the set of control switches identified in the selected memory file, each of the shown control switches being associated with one of the work units;
contacting the shown control switches to change the states of the work units associated with the shown switches;
displaying each shown control switch in a first common format when the work unit associated with the switch is in a first of the common states; and
displaying each shown control switch in a second common format when the work unit associated with the switch is in a second of the common states;
wherein for each switch in the set of switches identified in each of the memory files, the memory file identifies a current format for the switch and the state of the work unit associated with the switch; and
wherein the contacting step includes the steps of,
in each of the memory files in which each of the contacted control switches is identified, the processor
(i) changing the identified format of the switch, and
(ii) changing the identified state of the work unit associated with the switch.

9. A method according to claim 8, wherein a group of the work units has a third common state, and further including the step of displaying each shown control switch associated with one of said group of work units, in a third common format when said one work unit is in the third state.

10. A method according to claim 9, further including:
displaying a first common character on each shown control switch associated with one of said group of work units, when said one work unit is in the third state; and
displaying a second common character on each shown control switch when the work unit associated with the switch is in the second state.

11. A method according to claim 10, wherein said first, second and third states are deactuated, actuated and waiting states respectively, and when one of said group of work units is in the deactuated state and a shown control switch associated with said one work unit is contacted, said one work unit changes from the deactuated state to the waiting state, and further including:
illuminating first and second additional transient switches on the display means in said third common format when any one of said group of work units is changed to the waiting state from the deactuated state; and
contacting one of the first and second additional transient switches to change said one of the work units to the actuated state and deactuated state respectively.

12. A method according to claim 8, wherein:
the step of displaying each shown control switch in the first common format includes the step of displaying each shown control switch in a first color when the work unit associated with the switch is in the first state; and
the step of displaying each shown control switch in the second common format includes the step of displaying each shown control switch in a second color when the work unit associated with the switch is in the second state.

13. A method according to claim 9, wherein:
the step of displaying each shown control switch in the first common format includes the step of displaying each shown switch in a first color when the work unit associated with the switch is in the first state;
the step of displaying each shown control switch in the second common format includes the step of displaying each shown switch in a second color and with a first common character shown on the switch, when the work unit associated with the switch is in the second state; and
the step of displaying each shown control switch associated with one of said group of work units, in the third common format includes the step of displaying each shown switch associated with one of said group of work units, in a third color and with a second common character shown on the switch, when the work unit associated with the switch is in the third state.

* * * * *

UNITED STATES PATENT AND TRADEMARK OFFICE
CERTIFICATE OF CORRECTION

PATENT NO. : 5,055,996

DATED : October 8, 1991

INVENTOR(S) : Saul L. Keslowitz

It is certified that error appears in the above-identified patent and that said Letters Patent is hereby corrected as shown below:

Column 6, line 39: "associated unit" should read as --associated work unit--

Signed and Sealed this

Twenty-third Day of March, 1993

*Attest:*

STEPHEN G. KUNIN

*Attesting Officer*     *Acting Commissioner of Patents and Trademarks*